(12) United States Patent
Dobbs et al.

(10) Patent No.: US 8,377,509 B2
(45) Date of Patent: Feb. 19, 2013

(54) LITHIUM-BASED COMPOUND NANOPARTICLE COMPOSITIONS AND METHODS OF FORMING THE SAME

(75) Inventors: Robert J. Dobbs, Newfield, NY (US); Archit Lal, Ithaca, NY (US)

(73) Assignee: Primet Precision Materials, Inc., Ithaca, NY (US)

( * ) Notice: Subject to any disclaimer, the term of this patent is extended or adjusted under 35 U.S.C. 154(b) by 1355 days.

(21) Appl. No.: 11/712,831

(22) Filed: Feb. 28, 2007

(65) Prior Publication Data

US 2008/0280141 A1    Nov. 13, 2008

Related U.S. Application Data

(60) Provisional application No. 60/778,029, filed on Feb. 28, 2006, provisional application No. 60/877,122, filed on Dec. 22, 2006.

(51) Int. Cl.
*B05D 7/00*    (2006.01)

(52) U.S. Cl. .................... 427/212; 427/215; 977/811

(58) Field of Classification Search .......... 427/212, 427/215; 977/811
See application file for complete search history.

(56) References Cited

U.S. PATENT DOCUMENTS

| | | | |
|---|---|---|---|
| 5,427,734 A | 6/1995 | Yamashita et al. | |
| 5,789,114 A | 8/1998 | Adachi et al. | |
| 5,910,382 A | 6/1999 | Goodenough et al. | |
| 7,041,239 B2 * | 5/2006 | Barker et al. | 252/521.5 |
| 7,140,567 B1 * | 11/2006 | Dobbs | 241/184 |
| 7,771,628 B2 * | 8/2010 | Barker et al. | 252/521.5 |
| 2002/0102205 A1 | 8/2002 | Amatucci | |
| 2002/0114754 A1 | 8/2002 | Hosoya et al. | |
| 2004/0033360 A1 | 2/2004 | Armand et al. | |
| 2006/0003013 A1 | 1/2006 | Dobbs | |
| 2006/0127767 A1 * | 6/2006 | Gauthier et al. | 429/221 |
| 2007/0054187 A1 | 3/2007 | Nuspl et al. | |
| 2007/0160752 A1 * | 7/2007 | Mao | 427/212 |
| 2009/0155689 A1 * | 6/2009 | Zaghib et al. | 429/221 |
| 2009/0212267 A1 | 8/2009 | Dobbs et al. | |
| 2010/0136225 A1 | 6/2010 | Lai et al. | |
| 2011/0049421 A1 | 3/2011 | Dobbs et al. | |

FOREIGN PATENT DOCUMENTS

| | | |
|---|---|---|
| EP | 1193787 A2 | 4/2002 |
| EP | 1473277 A1 | 11/2004 |
| JP | 2001-015111 | 1/2001 |
| JP | 2002-117833 | 4/2002 |
| JP | 2003-034534 | 2/2003 |
| JP | 2003-292308 | 10/2003 |
| JP | 2004-509058 | 3/2004 |
| JP | 2007-103339 | 4/2007 |
| WO | WO 0199215 A1 | 12/2001 |
| WO | WO 02/27823 | 4/2002 |
| WO | WO 02/089233 A2 | 11/2002 |
| WO | WO 2004/008560 A2 | 1/2004 |
| WO | WO 2005/051840 | 6/2005 |
| WO | WO 2005/062404 | 7/2005 |
| WO | WO 2007/100918 | 9/2007 |

OTHER PUBLICATIONS

International Search Report from PCT/US2007/005410, mailed Oct. 23, 2007.
Office Action from CN200780015296.2, mailed May 6, 2011.
European Search Report from EP12153609, mailed Apr. 20, 2012.
Peramunage, D., et al., "Preparation of Micron-Sized Li4Ti5O12 and Its Electrochemistry in Polyacrylonitrile Electrolyte-Based Lithium Cells", J. Electrochem. Soc., vol. 145, No. 8, 1998, pp. 2609-2615.
Office Action from JP 2008-557411, mailed Oct. 29, 2012.

* cited by examiner

*Primary Examiner* — Leszek Kiliman
(74) *Attorney, Agent, or Firm* — Wolf, Greenfield & Sacks, P.C.

(57) ABSTRACT

Lithium-based compound small particle compositions, as well as methods and structures associated with the same, are provided. The particle compositions, in some cases, are characterized by having an nano-size particles. The particle compositions may be produced in a milling process. In some embodiments, the particles may be coated with a coating that may enhance certain properties of the particle composition (e.g., electrical conductivity).

15 Claims, 12 Drawing Sheets

US 8,377,509 B2

LITHIUM-BASED COMPOUND NANOPARTICLE COMPOSITIONS AND METHODS OF FORMING THE SAME

RELATED APPLICATIONS

This applications claims priority to U.S. Provisional Patent Application Ser. No. 60/778,029, filed on Feb. 28, 2007, and U.S. Provisional Patent Application Ser. No. 60/877,122, filed on Dec. 22, 2006, both of which are incorporated herein by reference.

FIELD OF INVENTION

The invention relates to generally to methods of forming small lithium-based compound particle compositions, as well as related particle compositions and structures.

BACKGROUND OF THE INVENTION

Lithium-based compounds, such as lithium metal phosphates (e.g., $LiFePO_4$) and lithium metal oxides (e.g., $LiMnNiO_2$), are materials that may be used in electrochemical cells such as batteries. The materials may be processed, for example, to form powders that are used to form electrodes (e.g., anode, cathode) of the cell. There is a desire in the art to improve electrochemical performance in cells including increased charging/discharging rates, increased power density and increased operational lifetime.

Milling processes typically use grinding media to crush, or beat, a product material to smaller dimensions. For example, the product material may be provided in the form of a powder having relatively large particles and the milling process may be used to reduce the size of the particles.

Grinding media may have a variety of sizes and shapes. In a typical milling process, the grinding media are used in a device known as a mill (e.g., ball mill, rod mill, attritor mill, stirred media mill, pebble mill). Mills typically operate by distributing product material around the grinding media and rotating to cause collisions between grinding media that fracture product material particles into smaller dimensions to produce a milled particle composition.

SUMMARY OF INVENTION

Methods of forming small lithium-based compound particle compositions are provided, as well as related particle compositions and structures.

In one aspect, the present invention provides a method for producing a coated particle composition. The method comprises providing a feed material comprising feed particles and a coating material precursor, and a fluid carrier. The method further comprises milling the feed material to form a composition comprising milled particles including a coating, wherein the milled particles have an average particle size of less than 250 nm.

In another aspect, the present invention provides a method for producing a lithium-based compound particle composition. The method comprises milling lithium-based compound feed particles to form a composition including lithium-based compound milled particles having an average particle size of less than 100 nm and a contamination level of less than 900 ppm.

In another aspect, the present invention provides milled particle compositions. The milled particle compositions comprise milled lithium-based compound particles having an average particle size of less than 100 nm and a contamination level of less than 900 ppm.

In another aspect, the present invention provides a method for producing particle compositions. The method comprises heating a lithium-based compound precursor to form a solid body comprising a lithium-based compound. The method further comprises processing the solid body to form feed particles comprising the lithium-based compound. The method further comprises milling the feed particles to form a composition including lithium-based compound milled particles having an average particle size of less than 100 nm.

In another aspect, the method comprises milling a feed material comprising a lithium-based compound precursor to form a first milled particle composition including milled particles. The method further comprises forming aggregates including the milled particles and processing the aggregates to form a composition comprising a lithium-based compound. The method further comprises milling the composition to form a second milled particle composition including milled particles having an average particle size of less than 100 nm.

Other aspects, embodiments and features of the invention will become apparent from the following detailed description when considered in conjunction with the accompanying drawings. The accompanying figures are schematic and are not intended to be drawn to scale. For purposes of clarity, not every component is labeled in every figure. Nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

DETAILED DESCRIPTION

Figure 1:
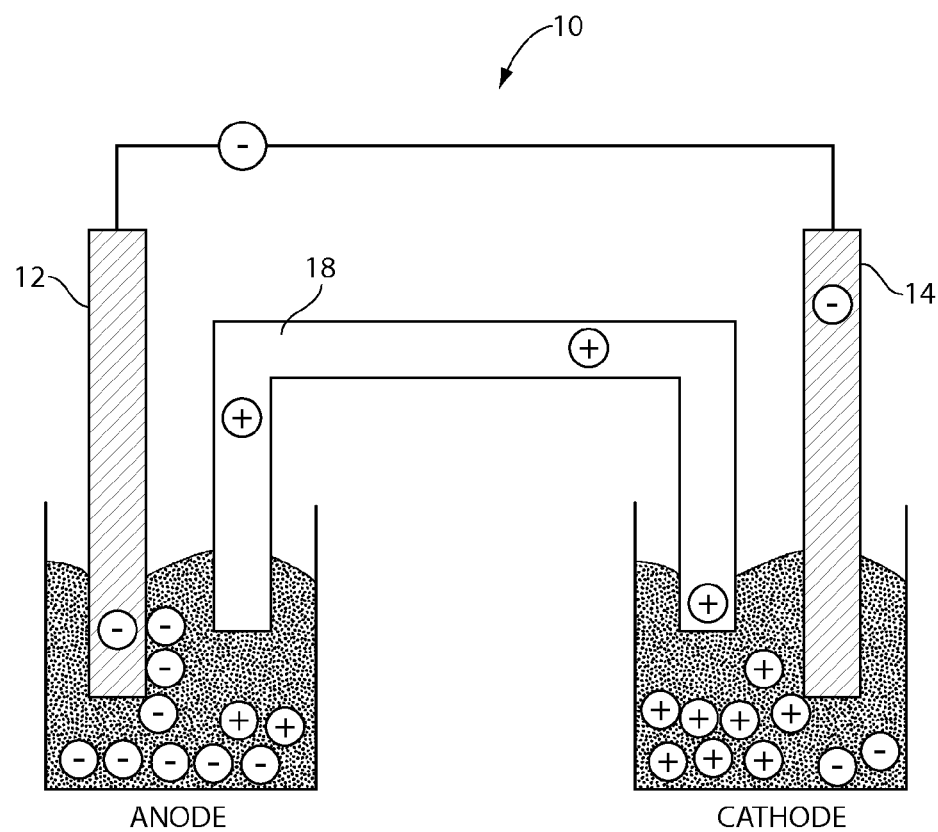
FIG. 1 illustrates a schematic electrochemical cell including an electrode formed from coated small particle compositions, according to an embodiment of the present invention.

Lithium-based compound small particle compositions, as well as methods and structures associated with the same, are provided. The particle compositions, in some cases, are characterized by having a nano-size particles. As described further below, the particle compositions may be produced in a milling process. The milling process may use preferred types of grinding media to form milled particle compositions having the desired characteristics (e.g., small particle size, shape, low contamination level). In some embodiments, the particles may be coated with a coating that may enhance certain properties of the particle composition (e.g., electrical conductivity). A coating material precursor can be milled along with feed material particles under desired conditions to form the coatings on the particles. The particle compositions may be used in a variety of different applications including electrochemical applications, such as in fuel cells, supercapacitors or as electrodes in batteries.

As noted above, the particles may comprise a lithium-based compound. As used herein, a "lithium-based compound" is a compound that comprises lithium and one or more additional elements. Examples of suitable lithium-based compounds include lithium phosphate-based compounds (i.e., compounds that comprise lithium and a phosphate group ($PO_4$) and may comprise one or more additional elements); lithium oxide-based compounds (i.e., compounds that comprise lithium and oxygen and may comprise one or more additional elements); and, lithium titanate-based compounds (i.e., compounds that comprise lithium and titanium and may comprise one or more additional elements). For example, suitable lithium phosphate-based compositions may have the general formula $LiMPO_4$, where M may represent one or more metals including transition metals such as Fe, Mn, Co, Ni, V, Cr, Ti, Mo and Cu. Examples of suitable lithium phosphate-based compositions include $LiFePO_4$, $LiMnPO_4$ and $LiFeMnPO_4$. Suitable lithium oxide-based compositions may have the general formula $LiMO_x$, where x is a suitable subscript (e.g., 2) and M may represent one or more metals including transition metals such as Fe, Mn, Co, Ni, V, Cr, Ti, Mo and Cu. Examples of suitable lithium oxide-based compositions include $LiMnNiO_2$. Suitable lithium titanate-based compositions include $L_4Ti_5O_{12}$, amongst others. It should be understood that the particle compositions may also include suitable dopants which, for example, may enhance electrical conductivity.

Suitable lithium-based compounds have been described in U.S. Pat. Nos. 5,871,866; 6,136,472; 6,153,333; 6,203,946; 6,387,569; 6,387,569; 6,447,951; 6,528,033; 6,645,452; 6,667,599; 6,702,961; 6,716,372; 6,720,110; and, 6,724,173 which are incorporated herein by reference.

In some embodiments, the average particle size of the milled particle composition is less than 500 nm. In certain embodiments, the average particle size may be even smaller. For example, the average particle size may be less than 250 nm, less than 150 nm, less than 100 nm, less than 75 nm, or less than 50 nm. In some embodiments, it may be preferred for the particle compositions to have very small particle sizes (e.g., an average particle size of less than 100 nm). In some cases, it is even possible to produce particle compositions having an average particle size of less than 30 nm, less than 20 nm, or less than 10 nm. Such particle sizes may be obtained, in part, by using grinding media having certain preferred characteristics, as described further below.

It should be understood that the particle sizes described herein may be for coated or uncoated lithium-based compound particle compositions.

The preferred average particle size of the lithium-based compound particle compositions typically depends on the intended application. In certain applications, it may be desired for the average particle size to be extremely small (e.g., less than 100 nm); while, in other applications, it may be desired for the average particle size to be slightly larger (e.g., between 100 nm and 500 nm). In general, milling parameters may be controlled to provide a desired particle size, though in certain cases it may be preferable for the average particle size to be greater than 1 nm to facilitate milling. For example, the average particle size of the milled material may be controlled by a number of factors including grinding media characteristics (e.g., density, size, hardness, toughness), as well as milling conditions (e.g., specific energy input).

For purposes of this application, the "average particle size" of a particle composition is the numeric average of the "particle size" of a representative number of primary particles (non-agglomerated) in the composition. The "particle size" of a primary particle (non-agglomerated) is its maximum cross-sectional dimension taken along an x, y, or z-axis. For example, the maximum cross-sectional diameter of a substantially spherical particle is its diameter. For the values in the description and claims of this application, the particle sizes are determined using microscopy techniques, such as scanning electron microscope or transmission electron microscope techniques.

It should also be understood that particle compositions having average particle sizes outside the above-described ranges (e.g., greater than 500 nm) may be useful in certain embodiments of the invention.

The particle compositions may also be relatively free of large particles. That is, the particle compositions may include only a small concentration of larger particles. For example, the $D_{90}$ values for the compositions may be any of the above-described average particle sizes. Though, it should be understood that the invention is not limited to such $D_{90}$ values.

The particle compositions may also have a very high average surface area. The high surface area is, in part, due to the very small particle sizes noted above. The average surface area of the particle compositions may be greater than 1 $m^2/g$; in other cases, greater than 5 $m^2$ g; and, in other cases, greater than 50 $m^2/g$. In some cases, the particles may have extremely high average surface areas of greater than 100 $m^2/g$; or, even greater than 500 $m^2/g$. It should be understood that these high average surface areas are even achievable in particles that are non-coated and/or substantially non-porous, though other particles may have surface pores. Surface area may be measured using conventional BET measurements. Such high surface areas may be obtained, in part, by using grinding media having certain preferred characteristics, as described further below.

Similar to particle size, the preferred average surface area of the particle composition typically depends on the intended application. In certain applications, it may be desired for the average surface area to be extremely large (e.g., greater than 50 $m^2/g$, or greater than 260 $m^2/g$); while, in other applications, it may be desired for the average surface area to be slightly smaller (e.g., between 50 $m^2/g$ and 1 $m^2/g$). In general, milling parameters may be controlled to provide a desired surface area, though in certain cases it may be preferable for the average surface area to be less than 3,000 $m^2/g$ (e.g., for substantially non-porous particles). For example, the average surface area of the milled particle compositions may be controlled by a number of factors including grinding media characteristics (e.g., density, size, hardness, toughness), as well as milling conditions (e.g., energy, time).

Amongst other advantages, the small particle size and/or high surface areas may lead to improved electrochemical performance (e.g., for batteries) such as increased charging/discharging rates, increased capacity, increased power density, increased cost savings, and increased operational lifetime (e.g., the number of charging/discharging cycles without degeneration).

An advantage of certain embodiments of the invention is that the particle sizes described herein can be achieved at very low contamination levels. The grinding media noted below may enable the low contamination levels when used with the above-described compositions because such characteristics lead to very low wear rates. For example, the milled compositions may have contamination levels may be less than 900 ppm, less than 500 ppm, less than 200 ppm, or even less than 100 ppm. In some processes, virtually no contamination may be detected which is generally representative of contamination levels of less than 10 ppm. As used herein, a "contaminant" is grinding media material introduced into the product material composition during milling. It should be understood that typical commercially available feed product materials may include a certain impurity concentration (prior to milling) and that such impurities are not includes in the definition of contaminant as used herein. Also, other sources of impurities introduced in to the product material, such as material from the milling equipment, are not included in the definition of contaminant as used herein. The "contamination level" refers to the weight concentration of the contaminant relative to the weight concentration of the milled material. Typical units for the contamination level are ppm. Standard techniques for measuring contamination levels are known to those of skill in the art including chemical composition analysis techniques.

It should be understood that methods of the invention may produce compositions having any of the particle size values described herein (including values of relative size between particles before and after milling) combined with any of the above-described contamination levels. For example, one method of the invention involves milling feed particles having an average initial particle size to form a milled particle composition having an average final particle size of less than 100 nm, wherein the initial particle size is greater than 100 times the final particle size and the milled particle composition has a contamination level of less than 500 ppm.

In some processes, the milled particle sizes are achieved when the feed material particles (prior to milling) have an average particle size of greater than 1 micron, greater than 10 micron, or even greater than 50 micron. In some processes, the average particle size of the feed material particles may be greater than 10 times, 50 times, 100 times, or greater than 500 times the average particle size of the milled material. The specific particle size of the milled material depends on a number of factors including milling conditions (e.g., energy, time), though is also dictated, in part, by the application in which the milled material is to be used. In general, the milling conditions may be controlled to provide a desired final particle size. The particle size of the feed material may depend on commercial availability, amongst other factors.

As noted above, the milled compositions may be produced at small particle sizes which can lead to a number of performance advantages. When in bulk composition form, the particles may be free-standing (i.e., not attached to a surface). As described further below, such milled particles may be further processed to form the desired structure (e.g., electrode). In some cases, the milled particles in the composition may be agglomerated. In some cases, the milled materials may be provided as a suspension of milled particles in a fluid carrier. It should be understood that the average particle sizes and average surface areas described herein refer to the particle size and surface area of primary particles (rather than the size and area of agglomerates of primary particles).

As described further below, the milled particle compositions can be produced in a milling process. Thus, these particle compositions may be described as having a characteristic "milled" morphology/topology. Those of ordinary skill in the art can identify "milled particles", which, for example, can include one or more of the following microscopic features: multiple sharp edges, faceted surfaces, and being free of smooth rounded "corners" such as those typically observed in chemically-precipitated particles.

It should be understood that the milled particles described herein may have one or more of the above-described microscopic features, while having other shapes (e.g., platelet) when viewed at lower magnifications.

It should be understood that not all embodiments of the invention are limited to milled particles or milling processes.

In some embodiments, it may be preferable for the particles to have a platelet shape. In these cases, the particles may have a relatively uniform thickness across the length of the particle. The particles may have a substantially planar first surface and a substantially planar second surface with the thickness extending therebetween. The particle thickness may be smaller than the particle width and particle length. In some embodiments, the length and width may be approximately equal; however, in other embodiments the length and width may be different. In cases where the length and width are different, the platelet particles may have a rectangular box shape. In certain cases, the particles may be characterized as having sharp edges. For example, the angle between a top surface (e.g., first planar surface) of the particle and a side surface of the particle may be between 75° and 105°; or between 85° and 95° degrees (e.g., about 90°). However, it should be understood that the particles may not have platelet shapes in all embodiments and that the invention is not limited in this regard. For example, the particles may have a substantially spherical or oblate spheroid shape, amongst others. It should be understood that within a milled particle composition, individual particles may be in the form of one or more of the above-described shapes.

In some cases, the shape of the particle may be altered upon coating.

In some embodiments, the compositions of the invention may comprise particles having a preferred crystallographic orientation. Suitable methods of forming the such particles have been described in commonly-owned, co-pending U.S. patent application Ser. No. 11/318,314, entitled "Small Particle Compositions and Associated Methods", filed on Oct. 27, 2005, which is incorporated herein by reference. In some embodiments, a majority (i.e., greater than 50%) of the particles in a composition may have the same crystallographic orientation. In other embodiments, greater than 75% of the particles, or even greater than 95%, or even substantially all, of the particles in a composition may have the same crystallographic orientation.

The preferred crystallographic orientation of the particles may depend, in part, on the crystal structure (e.g., olivine, spinel, hexagonal, tetragonal, cubic) of the material that forms the particles. Crystals generally preferentially fracture along specific planes with characteristic amounts of energy being required to induce fracture along such planes. During milling, such energy results from particle/grinding media collisions. It is observed that, by controlling the energy of such collisions via milling parameters (e.g., grinding media composition, specific energy input), it is possible to preferentially fracture particles along certain crystallographic planes which creates a particle composition having a preferred crystallographic orientation.

In some embodiments, the preferred crystallographic orientation is defined by a basal plane (i.e., the plane which is perpendicular to the principal axis (c axis) in a tetragonal or hexagonal structure). For example, the basal plane, and crystallographic orientation, may be the (0001) or (001) plane.

Crystallographic orientation of particles may be measured using known techniques. A suitable technique is x-ray diffraction (XRD). It may be possible to assess the relative percentage of particles having the same preferred crystallographic orientation using XRD.

As noted above, in some embodiments, the particles may be coated. The coating covers at least a portion of the surface area of the particles. In some cases, the coating may cover greater than 50%, greater than 75%, or substantially the entire (e.g., greater than 99%) surface area of the particles. The coating may have a thickness of less than 50 nm, less than 25 nm, or, in some cases, less than 10 nm. In some embodiments, the coating may have uniform thickness over a majority of the surface area of the particles. For example, the coating may have a thickness that varies less than 20% on greater than 50% of the surface area of the particles.

The coating may be used to enhance one or more properties of the particle compositions. For example, the coating may improve the performance of the particles in an electrode (e.g., of an electrochemical cell), wherein the coated particles may exhibit improved conductivity when compared to uncoated particles. In some cases, the coated particles may facilitate the transport of lithium or lithium ions within the electrochemical cell. Also, particles having a uniform coating may exhibit more consistent properties than particles having a non-uniform coating.

The coating material, and the coating material precursor, may be any suitable material capable of coating the surface of a particle. In some cases, the coating material is an electrically conductive material. In some embodiments, the coating may be comprised substantially of carbon. For example, the coating material precursor may be provided by a carbon-containing material such as graphite (e.g., superior graphite), carbon nanotubes, acetylene black, polyols, or the like, and may be used to coat particles in processes as described herein. In some embodiments, the coating may comprise an inorganic material, such as metal oxides or metal nitrides. Some specific examples of inorganic materials include alumina and ceria. In some embodiments, the coating may comprise a metal, such as Cu or Sn. The coating material may further comprise additional components to enhance the surface of the particles, such as silanes, for example. It should be understood that other coating compositions are also possible.

The coating material precursor may be in the form of particles (e.g., nanoparticles) that are smaller in size than the lithium-based compound particles. The coating material precursor particles may be attached to surfaces of the lithium-based compound particles to form a coating. The coating (e.g., coating material particles) may be attached to the lithium-based compound particles via covalent or non-covalent interactions (e.g., hydrogen-bonding, ionic bonding, electrostatic interactions, van der Waals interactions, etc.).

Compositions containing particles (e.g., active material) dispersed within a support material, such as a carbon support material, may also be formed. Such compositions may have particles that are separated from one another, which may increase the exposed surface area of the particles.

As noted above, lithium-based compound particle compositions may be used in a number of applications including electrochemical applications. FIG. 1 schematically illustrates an electrochemical cell 10 according to one embodiment of the invention. The electrochemical cell includes an anode 12 (i.e., negative electrode) connected to a cathode 14 (i.e., positive electrode) via an external circuit 16. The anode and/or cathode may comprise the lithium-based compound particle compositions described herein. An oxidation reaction occurs at the anode where electrons are lost and a reduction reaction occurs at the cathode where electrons are gained. An electrolyte 18 allows positive ions to flow from the anode to the cathode, while electrons flow through the external circuit which can function as a power source. A separator may electrically isolate the anode and the cathode, amongst other functions.

Figure 2:
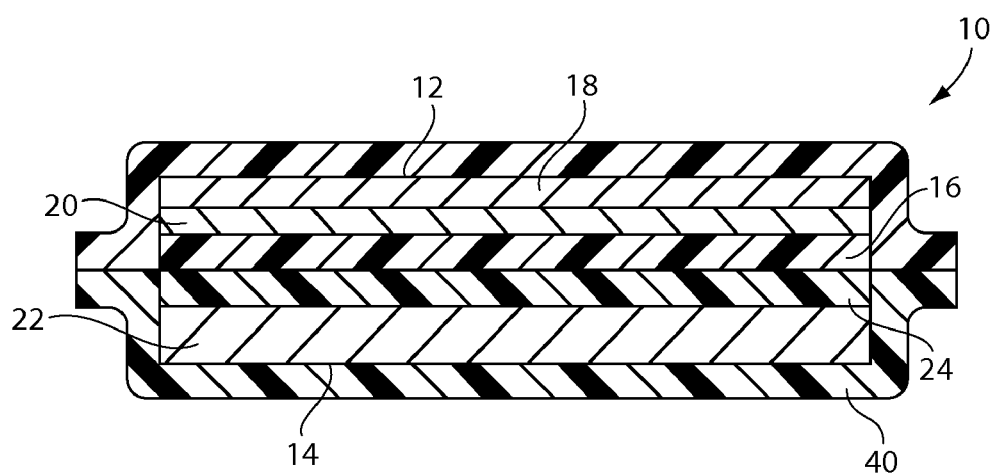
FIG. 2 illustrates a battery structure including an electrode formed from coated small particle compositions, according to an embodiment of the present invention.

FIG. 2 schematically illustrates a battery cell structure 20 according to another embodiment of the invention. The battery cell structure includes an anode side 22, a cathode side 24 and an electrolyte/separator 26 positioned therebetween. The anode side includes a current collector 28 (e.g. formed of copper open mesh grid) formed on an active material layer 30. The cathode side includes a current collector 32 (e.g., formed of an aluminum open mesh grid) and an active material layer 34. A protective cover 38 may surround the battery cell structure.

Any suitable electrolyte/separator may be used. For example, the electrolyte/separator may be a solid electrolyte or separator and liquid electrolyte. Solid electrolytes can include polymer matrixes. Liquid electrolytes can comprise a solvent and an alkaline metal salt, which form an ionically conducting liquid.

The lithium-based compound particle compositions may be dispersed in a matrix of other components including binder materials to form anode and cathode active material layers 30, 34.

It should be understood that electrochemical cells (e.g., batteries) of the invention may have a variety of different structures constructions and the invention is not limited in this regard. Suitable electrochemical cells (e.g., batteries) have been described in some of the U.S. Patents incorporated herein by reference above.

Particle compositions may be produced in a milling process that use grinding media as described herein. The processes may utilize a wide range of conventional mills having a variety of different designs and capacities. Suitable types of mills include, but are not limited to, ball mills, rod mills, attritor mills, stirred media mills, pebble mills and vibratory mills, among others. In some cases, the milling process may be used to de-agglomerate particles in the fluid carrier. In some cases, the milling process may also be used to produce coated particles as described herein.

In some cases, conventional milling conditions (e.g., energy, time) may be used to process the particle compositions using the grinding media described herein. In other cases, the grinding media described herein may enable use of milling conditions that are significantly less burdensome (e.g., less energy, less time) than those of typical conventional milling processes, while achieving a superior milling performance (e.g., very small average particle sizes). In some cases, the stress energy may be greater than that of typical conventional milling processes.

Advantageously, the grinding media enable advantageous milling conditions. For example, lower milling times and specific energy inputs can be utilized because of the high milling efficiency of the grinding media of the invention. As used herein, the "specific energy input" is the milling energy consumed per weight product material. Even milled particle compositions having the above-noted particle sizes and contamination levels can be produced at low milling input energies and/or low milling times. For example, the specific energy input may be less than 125,000 kJ/kg; or less than 90,000 kJ/kg. In some cases, the specific energy input may be even lower such as less than 50,000 kJ/kg or less than 25,000 kJ/kg. The actual specific energy input and milling time depends strongly on the composition of the product material and the desired reduction in particle size, amongst other factors.

Milling processes of the invention can involve the introduction of feed product material (e.g., feed particles) and a fluid carrier into a processing space in a mill in which the grinding media are confined. The viscosity of the slurry may be controlled, for example, by adding additives to the slurry such as dispersants. The mill is rotated at a desired speed and material particles mix with the grinding media. Collisions between the particles and the grinding media can reduce the size of the particles. The particles are typically exposed to the grinding media for a certain mill time after which the milled material is separated from the grinding media using conventional techniques, such as washing and filtering, screening or gravitation separation. The milling process may be performed at any temperature, including room temperature. In some processes, the slurry of particles is introduced through a mill inlet and, after milling, recovered from a mill outlet. The process may be repeated and, a number of mills may be used sequentially with the outlet of one mill being fluidly connected to the inlet of the subsequent mill.

The milling process may be performed under ambient conditions (e.g., under exposure to air). The milling process may also be performed in the absence of air, for example, under a nitrogen atmosphere, argon atmosphere, or other suitable conditions.

As noted above, it may be preferred to use grinding media having specific characteristics. However, it should be understood that not every embodiment of the invention is limited in this regard. In some embodiments, the grinding media is formed of a material having a density of greater than 6 grams/cm$^3$; in some embodiments, greater than 8 grams/cm$^3$; in some embodiments, the density is greater than 10 grams/cm$^3$; or greater than 15 grams/cm$^3$; or, even, greater than 18 grams/cm$^3$. Though, in certain embodiments, the density of the grinding media may be less than 22 grams/cm$^3$, in part, due to difficulties in producing suitable grinding materials having greater densities. It should be understood that conventional techniques may be used to measure grinding media material density.

In certain embodiments, it also may be preferable for the grinding media to be formed of a material having a high fracture toughness. For example, in some cases, the grinding media is formed of a material having a fracture toughness of greater than 6 MPa/m$^{1/2}$; and in some cases, the fracture toughness is greater than 9 MPa/m$^{1/2}$. The fracture toughness may be greater than 12 MPa/m$^{1/2}$ in certain embodiments. Conventional techniques may be used to measure fracture toughness. Suitable techniques may depend, in part, on the type of material being tested and are known to those of ordinary skill in the art. For example, an indentation fracture toughness test may be used. Also, a Palmqvist fracture toughness technique may be suitable, for example, when testing hard metals.

It should be understood that the fracture toughness values disclosed herein refer to fracture toughness values measured on bulk samples of the material. In some cases, for example, when the grinding media are in the form of very small particles (e.g., less than 150 micron), it may be difficult to measure fracture toughness and the actual fracture toughness may be different than that measured on the bulk samples.

In certain embodiments, it also may be preferable for the grinding media to be formed of a material having a high hardness. It has been found that media having a high hardness can lead to increased energy transfer per collision with product material which, in turn, can increase milling efficiency. In some embodiments, the grinding media is formed a material having a hardness of greater than 75 kgf/mm$^2$; and, in some cases, the hardness is greater than 200 kgf/mm$^2$. The hardness may even be greater than 900 kgf/mm$^2$ in certain embodiments. Conventional techniques may be used to measure hardness. Suitable techniques depend, in part, on the type of material being tested and are known to those of ordinary skill in the art. For example, suitable techniques may include Rockwell hardness tests or Vickers hardness tests (following ASTM 1327). It should be understood that the hardness values disclosed herein refer to hardness values measured on bulk samples of the material. In some cases, for example, when the grinding media are in the form of very small particles (e.g., less than 150 micron), it may be difficult to measure hardness and the actual hardness may be greater than that measured on the bulk samples.

It should be understood that not all milling processes of the present invention use grinding media having each of the above-described characteristics.

Milling processes of the invention may use grinding media having a wide range of dimensions. In general, the average size of the grinding media is between about 0.5 micron and 10 cm. The preferred size of the grinding media used depends of a number of factors including the size of the feed particles, desired size of the milled particle composition, grinding media composition, and grinding media density, amongst others.

In certain embodiments, it may be advantageous to use grinding media that are very small. It may be preferred to use grinding media having an average size of less than about 250 microns; or, less than about 150 microns (e.g., between about 75 and 150 microns). In some cases, the grinding media may have an average size of less than about 100 microns; or even less than about 10 microns. Grinding media having a small size have been shown to be particularly effective in producing particle compositions having very small particle sizes (e.g., less than 1 micron). In some cases, the grinding media may have an average size of greater than 0.5 micron.

It should be understood that the average size of grinding media used in a process may be determined by measuring the cross-sectional dimension (e.g., diameter for substantially spherical grinding media) of a representative number of grinding media particles.

The grinding media may also have a variety of shapes. In general, the grinding media may have any suitable shape known in the art. In some embodiments, it is preferred that the grinding media be substantially spherical (which may be used herein interchangeably with "spherical"). Substantially spherical grinding media have been found to be particularly effective in obtaining desired milling performance.

It should also be understood that any of the grinding media used in methods of the invention may have any of the characteristics (e.g., properties, size, shape, composition) described herein in combination with one another. For example, grinding media used in methods of the invention may have any of the above-noted densities and above-noted average sizes (e.g., grinding media may have a density of greater than about 6 grams/cm$^3$ and an average size of less than about 250 micron).

The above-described grinding media characteristics (e.g., density, hardness, toughness) are dictated, in part, by the composition of the grinding media. In certain embodiments, the grinding media may be formed of a metallic material including metal alloys or metal compounds. In one set of embodiments, it may be preferred that the grinding media are formed of ferro-tungsten material (i.e., Fe—W). In some cases, the compositions may comprise between 75 and 80 weight percent iron and between 20 and 25 weight percent tungsten. In some cases, ferro-tungsten grinding media may be carburized to improve wear resistance.

In other embodiments, the grinding media may be formed of a ceramic material such as a carbide material. In some embodiments, the grinding media to be formed of a single carbide material (e.g., iron carbide ($Fe_3C$), chromium carbide ($Cr_7C_3$), molybdenum carbide ($Mo_2C$), tungsten carbide (WC, $W_2C$), niobium carbide (NbC), vanadium carbide (VC), and titanium carbide (TiC)). In some cases, it may be preferred for the grinding media to be formed of a multi-carbide material. A multi-carbide material comprises at least two carbide forming elements (e.g., metal elements) and carbon.

A multi-carbide material may comprise a multi-carbide compound (i.e., a carbide compound having a specific stoichiometry; or, a blend of single carbide compounds (e.g., blend of WC and TiC); or, both a multi-carbide compound and a blend of single carbide compounds. It should be understood that multi-carbide materials may also include other components such as nitrogen, carbide-forming elements that are in elemental form (e.g., that were not converted to a carbide during processing of the multi-carbide material), amongst others including those present as impurities. Typically, but not always, these other components are present in relatively minor amounts (e.g., less than 10 atomic percent).

Suitable carbide-forming elements in multi-carbide grinding media of the invention include iron, chromium, hafnium, molybdenum, niobium, rhenium, tantalum, titanium, tungsten, vanadium, zirconium, though other elements may also be suitable. In some cases, the multi-carbide material comprises at least two of these elements. For example, in some embodiments, the multi-carbide material comprises tungsten, rhenium and carbon; in other cases, tungsten, hafnium and carbon; in other cases, molybdenum, titanium and carbon.

Suitable grinding media compositions have been described, for example, in U.S. Patent Application Publication No. 2006-0003013 which is incorporated herein by reference and is based on U.S. patent application Ser. No. 11/193,688, filed on Jul. 29, 2005, entitled "Grinding Media Compositions and Methods Associated With the Same". Suitable grinding media compositions have also been described, for example, U.S. Pat. No. 7,140,567 which is incorporated herein by reference.

In some embodiments, it may be preferred for the multi-carbide material to comprise at least tungsten, titanium and carbon. In some of these cases, the multi-carbide material may consist essentially of tungsten, titanium and carbon, and is free of additional elements in amounts that materially affect properties. Though in other cases, the multi-carbide material may include additional metal carbide forming elements in amounts that materially affect properties. For example, in these embodiments, tungsten may be present in the multi-carbide material in amounts between 10 and 90 atomic %; and, in some embodiments, in amounts between 30 and 50 atomic %. The amount of titanium in the multi-carbide material may be between 1 and 97 atomic %; and, in some embodiments, between 2 and 50 atomic %. In these embodiments that utilize tungsten-titanium carbide multi-carbide material, the balance may be carbon. For example, carbon may be present in amounts between 10 and 40 atomic %. As noted above, it should also be understood that any other suitable carbide forming elements can also be present in the multi-carbide material in these embodiments in addition to tungsten, titanium and carbon. In some cases, one or more suitable carbide forming elements may substitute for titanium at certain sites in the multi-carbide crystal structure. Hafnium, niobium, tantalum and zirconium may be particularly preferred as elements that can substitute for titanium. Carbide-forming elements that substitute for titanium may be present, for example, in amounts of up to 30 atomic % (based on the multi-carbide material). In some cases, suitable multi-carbide elements may substitute for tungsten at certain sites in the multi-carbide crystal structure. Chromium, molybdenum, vanadium, tantalum, and niobium may be particularly preferred as elements that can substitute for tungsten. Carbide-forming elements that substitute for tungsten may be present, for example, in amounts of up to 30 atomic % (based on the multi-carbide material).

It should also be understood that the substituting carbide forming elements noted above may completely substitute for titanium and/or tungsten to form a multi-carbide material free of tungsten and/or titanium.

It should be understood that grinding media compositions that are not disclosed herein but have certain above-noted characteristics (e.g., high density) may be used in embodiments of the invention. Also, it should be understood that milling processes of the present invention are not limited to the grinding media compositions and/or characteristics described herein. Other suitable grinding media may also be used.

In general, any suitable process for forming grinding media compositions may be used. In some cases, the processes involve heating the components of the composition to temperatures higher than the respective melting temperatures of the components followed by a cooling step to form the grinding media. A variety of different heating techniques may be used including a thermal plasma torch, melt atomization, and arc melting, amongst others. For example, one suitable process involves admixing fine particles of the elements intended to comprise the grinding media in appropriate ratios. The stability of the mixture may be enhanced by introduction of an inert binding agent (e.g., which burns off and does not form a component of the grinding material). The mixture may be subdivided into a plurality of aggregates (e.g., each having a mass approximately equal to that of the desired media particle to be formed). The aggregates may be heated to fuse (e.g., to 90% of theoretical density) and, eventually, melt individual aggregates to form droplets that are cooled to form the grinding media.

In some embodiments, the grinding media may be formed of two different materials. For example, the grinding media may be formed of a blend of two different ceramic materials (e.g., a blend of high density ceramic particles in a ceramic matrix); or a blend of a ceramic material and a metal (e.g., a blend of high density ceramic materials in a metal matrix).

In some embodiments in which the grinding media comprises more than one material component, the grinding media may comprise coated particles. The particles may have a core material and a coating formed on the core material. The coating typically completely covers the core material, but not in all cases. The composition of the core and coating materials may be selected to provide the grinding media with desired properties such as a high density. For example, the core material may be formed of a high density material (e.g., greater than 8 grams/$cm^3$). The core, for example, may be formed of a metal such as steel or depleted uranium; or a ceramic such as a metal carbide.

As noted above, the lithium-based compound particles may be coated. A milling process may be used to produce coated particles. It may be preferred for the same milling process used to reduce the size of the lithium-based compound particles also to be used to coat the particles. In these embodiments, particle size reduction is done in-situ with coating. In some cases, the size reduction and coating steps can occur consecutively; in other cases, size reduction and coating may occur at least somewhat (or entirely) simultaneously. In some embodiments, the milling process may also be used to de-agglomerate the lithium-based compound particles and/or the coating material precursor particles (when present). In these embodiments, de-agglomeration can be done in-situ with particle size reduction and coating.

In some embodiments, a lithium-based compound feed material including feed particles and a coating material precursor (e.g., coating material precursor particles) is suspended in a fluid carrier, and the suspension may be milled. As noted above, any suitable coating material precursor particle composition may be used, such as carbon black particles. In some cases, the fluid carrier is aqueous (e.g., water, or water-soluble fluids). In some cases, the fluid carrier is non-aqueous (e.g., an organic solvent). The feed material may be combined with a fluid carrier prior to and/or during milling. In some embodiments, the feed particles and coating material precursor may be milled in the absence of the fluid carrier to partially coat the particles, which may then be combined with the fluid carrier and milled.

The fluid carrier may be selected such that, when milling occurs under ambient conditions (e.g., exposure to air), the fluid carrier does not undergo a chemical reaction with the feed material. For example, in the presence of oxygen, a feed material might participate in a chemical reaction with fluid carriers such as water, such that the feed material is altered. In some cases, a feed material including a metal oxide (e.g., iron oxide or manganese oxide) may be oxidized in the presence of water and air. Methods of the invention may advantageously reduce or prevent such reactions by selecting solvents (e.g., NMP, isopropyl alcohol) which are essentially inert to the feed material, upon exposure to ambient conditions.

In some cases, the entire milling and coating process is performed in the absence of a fluid carrier (i.e., a dry process).

In some embodiments, a suspension containing the lithium-based compound feed particles and the fluid carrier may be milled to de-agglomerate the feed particles within the fluid carrier prior to adding the coating material precursor particles. Also, the coating material precursor particles may be de-agglomerated by milling prior to attaching to surfaces of the lithium-based compound particles.

In certain embodiments, the milling process may also be used to produce a composition containing particles dispersed within a support material. For example, a feed material including feed particles and a support material precursor (e.g., carbon) may be milled as described herein.

The suspension comprising the feed material and the fluid carrier may comprise at least 10% solid loading (e.g., feed particles and coating material precursor) of the feed material in the fluid carrier. In some cases, the suspension comprises at least 20%, at least 30% at least 40%, or, in some case, at least 50% solid loading of the feed material in the fluid carrier. In one set of embodiments, the suspension comprises 20-25% solid loading of the feed material in the fluid carrier. In some cases, the suspension comprises 10-20 wt % solid loading of the feed material in the fluid carrier.

It should be understood that the feed material may comprise additional components, such as surfactants, binders, acids, bases, or other suitable dopants which may enhance the ability of the feed material to form coated, milled particles using methods of the invention.

The lithium-based compound feed particles and the coating material precursor may interact to form a coated particle. In some cases, the interaction may be a mechanical interaction. In some cases, the interaction may be an electrostatic interaction. For example, the lithium-based compound particle may have a relatively negatively charged surface and the coating material precursor particles may have a relatively positively charged surface, such that, upon milling, the lithium-based compound particles are coated with the coating material precursor particles via an electrostatic interaction to produce milled, coated particles. Various components of the lithium-based compound particles may be treated to have a charged surface, either prior to or during milling. In some cases, a component of the lithium-based compound may be treated with a chemical reagent such as an acid.

The fluid carrier may also be capable of facilitating the coating and/or milling process by enhancing a property, such as an electrostatic property, of the particle or the coating material precursor. For example, the feed particles may comprise a material that, when combined with a fluid carrier, may interact with the fluid carrier produce a charged surface.

In an illustrative embodiment, a feed material comprising feed particles and a coating material precursor may be combined with an aqueous fluid carrier such as water or N-methyl-pyrrolidinone (NMP). The feed particles may comprise a lithium-based compound (e.g., a lithium phosphate-based compound), such that, when the feed particles are combined with the aqueous fluid carrier, the feed particles have a negatively charged surface. The coating material precursor may be treated with an acid such that the coating material precursor has a positively charged surface. Combination of the negatively charged feed particles and the positively charged coating material precursor in a milling process as described herein may then produce coated, milled lithium-based compound particles.

In some cases, electrode materials may be produced using methods involving a fluid carrier, such as NMP, as described herein.

Fluid carriers suitable for use in the invention may include any fluid capable of forming a fluid mixture, solution, suspension, or dispersion with components of the feed material (e.g., feed particle, coating material precursor). The fluid carrier may be aqueous or non-aqueous (e.g., organic). In some cases, the fluid carrier is hydrophobic. In some cases, the fluid carrier is hydrophilic. Examples of fluid carriers may include neat water, aqueous solutions, hydrocarbons such as hexanes, aromatic hydrocarbons, ethers, and the like. In some cases, the solvent may be N-methylpyrrolidinone (NMP), N,N-dimethylformamide (DMF), dimethylsulfoxide (DMSO), and the like.

The lithium-based compound feed particles may be evenly dispersed within the fluid carrier, such that aggregation of particles may be reduced. This may facilitate uniform coating of the particles, allowing a substantial majority of individual particles to contact the coating material precursor. In contrast, particles which form an agglomeration of particles may not be uniformly coated, as the coating material precursor may only contact particles on the exterior of the agglomeration.

Another aspect of the invention is that the small particle compositions of the invention may be produced using very low specific energy input (i.e., energy consumed in milling process per weight of feed material).

In another embodiment, the milling process may involve milling a feed material comprising feed particles and a support material precursor to form a composition comprising milled particles supported by the support material. In this embodiment, the milled particles are substantially separated from one another within the support material.

Some embodiments of the invention may involve melt processing steps that can be used in combination with the milling processes above to produce lithium-based compound nanoparticle compositions. The melt process may be used in the formation of a solid body and/or may involve a chemical reaction. In some cases, the chemical reaction may involve heating lithium-based compound precursors (such as lithium carbonate and iron phosphate), with or without additional components, to produce a lithium-based compound. The lithium-based compound precursors may be in the form of nanoparticles. In some cases, a solid state reaction (e.g., a melt process) between lithium-based compound precursors (e.g., lithium carbonate and iron phosphate) may produce a lithium-based compound (e.g., lithium iron phosphate). In some embodiments, the method may involve heating (e.g., melting) lithium-based compound precursors to form a solid body comprising the lithium-based compound. The solid body may then be processed using known methods to produce lithium-based compound feed particles. For example, the solid body may be crushed to produce feed particles. The feed particles may then be milled as described herein to produce the lithium-based compound nanoparticle compositions.

In some embodiments, the methods may involve milling a feed material including lithium-based compound precursor(s) to form a milled particle composition. The milled particle composition may include milled particles comprising the lithium-based compound precursor(s). The milled particle composition may be treated to form aggregates, which can be further processed to form a composition comprising a lithium-based compound. For example, the aggregate may be melted or otherwise reacted such that a chemical reaction occurs to form a composition comprising a lithium-based compound. In some cases, the aggregate may be treated in a furnace, where individual aggregates are dropped and melted in flight. The composition may then be milled as described herein to produce the lithium-based compound nanoparticle compositions. In some cases, the aggregates may be reacted such that the components of the milled particles react to produce particles containing the lithium-based compound, which may be further milled as described herein to produce the lithium-based compound nanoparticle compositions.

Methods involving a melt process may also be used to produce coated milled particle compositions. The coating precursor (including those described above) may be introduced at any time, such as during the milling, heating/melting, reacting, or any other processing step, to form coated milled particle compositions.

The particles may be further processed as desired for the intended application. For example, known processing techniques may be used to incorporate the particles in components (e.g., electrodes) used in electrochemical cells (e.g., batteries) as described above. The electrochemical cells (e.g., batteries) may be used in applications requiring small dimensions such as smart cards. In some embodiments, the particles may be coated with a thin layer of material (e.g., carbon). It should be understood that particles that the lithium phosphate-based compositions may be used in any other suitable application and that the invention is not limited in this regard.

Particles which are processed using methods described herein may have many advantages. For example, the particles may be more uniformly coated than particles coated using known methods. This may produce particles having improved (e.g., more consistent) properties. Milling processes of the invention may be simple and efficient and may eliminate the need for additional processing steps, when compared to known methods. In some cases, the feed particles may be milled and coated in one milling step. In some cases, the desired particle composition (including desired particle sizes) may be obtained without need for additional processing steps, such as spray-drying, re-firing, etc. For example, in one embodiment, the milled particle composition may include crystalline, milled particles, without requiring an additional step to provide a crystalline structure. In some cases, the milling process retains the crystalline structure of the feed particles (prior to milling) in the milled particles. For example, the feed particles and the milled particles may both have a spinel structure; or, the feed particles and the milled particles may both have an olivine structure. Methods of the invention may provide more simple, cost-effective methods for processing particles including coated particles.

The following examples should not be considered to be limiting but illustrative of certain features of the invention.

EXAMPLE 1

This example illustrates production of a lithium-based compound particle composition in accordance with an embodiment of the present invention.

$LiMnPO_4$ nanoparticle compositions were produced in a milling process. The milling process used a mill and multi-carbide material grinding media having a relatively high mass density and a size of between about 75 and 125 microns. About 20 grams of $LiMnPO_4$ was dispersed in water to form a solids loading of about 9% by weight. The specific energy applied to the slurry was 79,600 kJ/kg. Milled particles were produced and collected.

Figure 3:
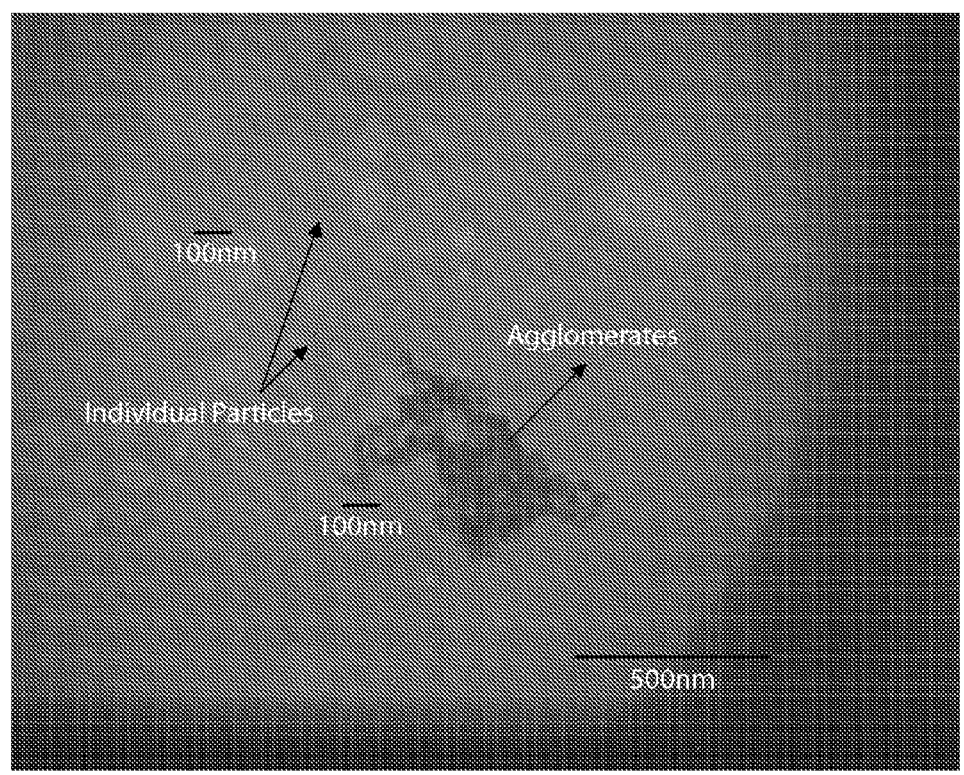
FIG. 3 is a copy of a TEM image of $LiMnPO_4$ nanoparticles described in Example 1.
Figure 4:
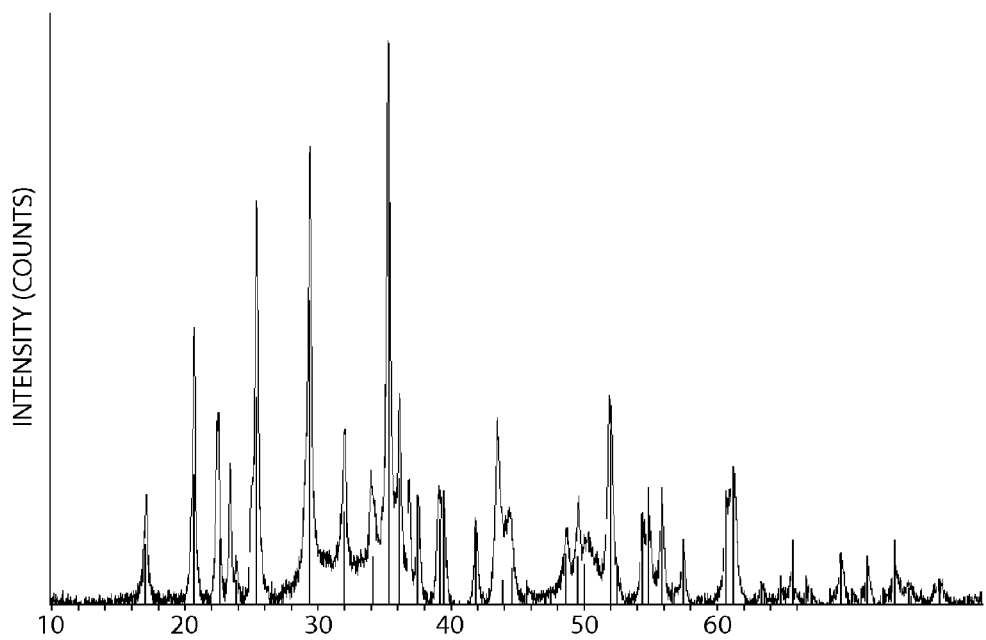
FIG. 4 is a plot of XRD data obtained from the $LiMnPO_4$ particle composition described in Example 1.

The milled particles were characterized using several techniques. The BET surface area was measured to be about 37 $m^2/g$ using a multi-point BET measurement instrument. Particle size analysis was conducted using a TEM. The average particle size was determined to be less than 50 nm. FIG. 3 is a copy of a TEM image showing a representative portion of the milled nanoparticle composition. XRD analysis indicated that the $LiMnPO_4$ had a pure olivine crystal structure which is identical to the crystal structure of the feed particles (prior to milling). FIG. 4 is a plot of the XRD data.

EXAMPLE 2

This example illustrates production of a lithium-based compound coated particle composition in accordance with an embodiment of the present invention.

Carbon-coated $LiMnPO_4$ nanoparticle compositions were produced in a milling process. The milling process used a mill and multi-carbide material grinding media. About 20 g $LiMnPO_4$ was added slowly to 265 g of $H_2O$ within the mill and processed at a specific energy of 5000 kJ/kg to de-agglomerate the particles to form a slurry. Conductive carbon black particles (3.5 g) was added directly to the slurry within the mill and was processed at a specific energy of 20,000 kJ/kg. Nitric acid was added to the slurry within the mill to promote deposition of the carbon black particles on surfaces of the $LiMnPO_4$ particles thereby forming coatings. The resulting material was dried under vacuum at a minimum heat setting until dry (about 96 hours) and carbon-coated $LiMnPO_4$ nanoparticle compositions were obtained.

EXAMPLE 3

This example illustrates production of a lithium-based compound coated particle composition in accordance with an embodiment of the present invention.

Carbon-coated LiMnPO$_4$ nanoparticle compositions were produced in a milling process. The milling process used a mill and Zirmil® grinding media (commercially available from Saint-Gobain). About 15 g LiMnPO$_4$ was mixed with 200 g of H$_2$O within the mill to form a slurry. Conductive carbon black particles (2.6 g), 10 mL of water, and a drop of nitric acid were added directly to the slurry within the mill and the slurry was processed at a specific energy of 26,400 kJ/kg. The nitric acid was added to the slurry within the mill to promote deposition of the carbon black particles on surfaces of the LiMnPO$_4$ particles thereby forming coatings. A peristaltic pump was used with an agitator speed of 1269 rpm. Carbon-coated LiMnPO$_4$ nanoparticle compositions were obtained.

Figure 5A:
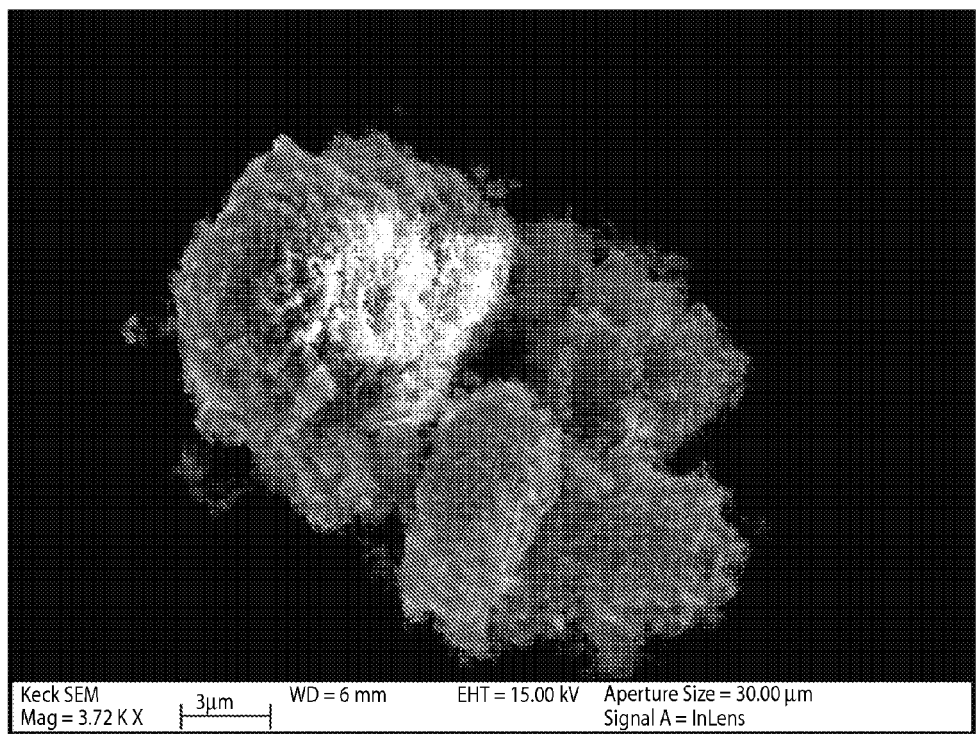
FIGS. 5A-B are copies of SEM images of the $LiMnPO_4$ particle composition described in Example 3.
Figure 5B:
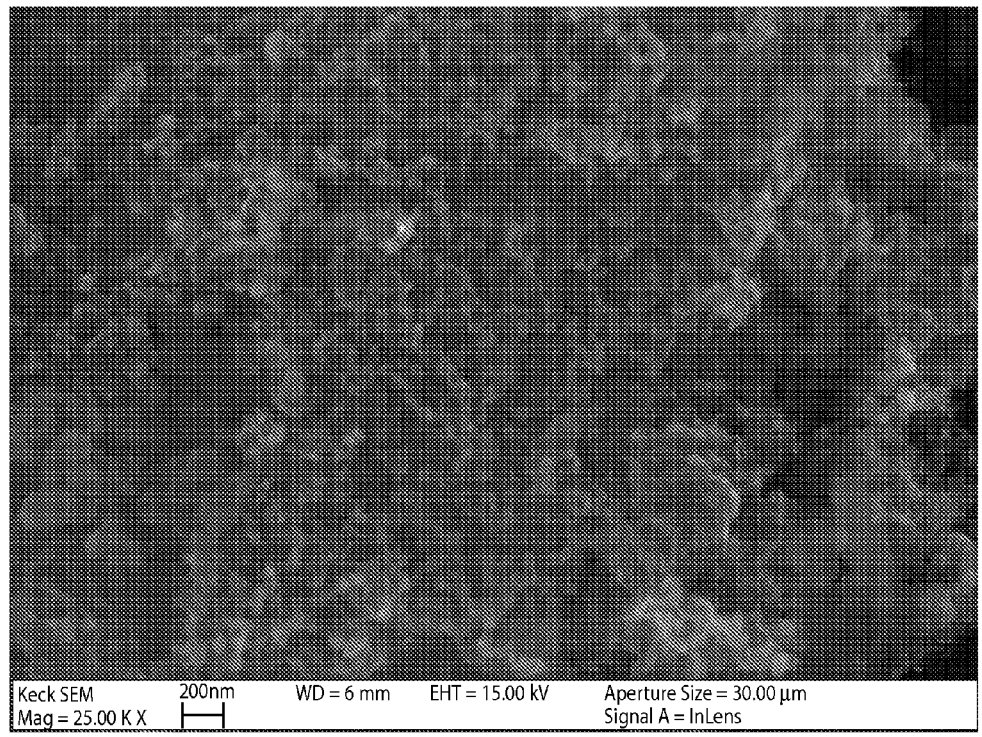

Particle size analysis was conducted using an SEM. The average particle size was determined to be less than 200 nm. FIGS. 5A-B are copies of SEM images showing a representative portion of the milled nanoparticle composition.

EXAMPLE 4

This example illustrates production of a lithium-based compound coated particle composition in accordance with an embodiment of the present invention.

Carbon-coated LiMnPO$_4$ nanoparticle compositions were produced in a milling process. The milling process used a mill and Zirmil® grinding media (commercially available from Saint-Gobain). About 20 g LiMnPO$_4$ was mixed with 170 g of NMP within the mill to form a slurry. Conductive carbon black particles (3.5 g) were added directly to the slurry within the mill and the slurry was processed at a specific energy of 10,500 kJ/kg. A peristaltic pump was used with an agitator speed of 1746 rpm. Carbon-coated LiMnPO$_4$ nanoparticle compositions were obtained.

EXAMPLE 5

This example illustrates production of a lithium-based compound coated particle composition in accordance with an embodiment of the present invention.

Carbon-coated Li$_4$Ti$_5$O$_{12}$ nanoparticle compositions were produced in a milling process. The milling process used a mill and multi-carbide material grinding media. About 30 g Li$_4$Ti$_5$O$_{12}$ was mixed with 200 g of H$_2$O and one drop of Sokolan PA80S within the mill to form a slurry. The pH of the mixture was adjusted to 12 by adding two drops of a 6M KOH solution. The slurry was processed at a specific energy of 50,000 kJ/kg. A peristaltic pump was used with an agitator speed of 1212 rpm. Carbon-coated Li$_4$Ti$_5$O$_{12}$ nanoparticle compositions were obtained.

Figure 6A:
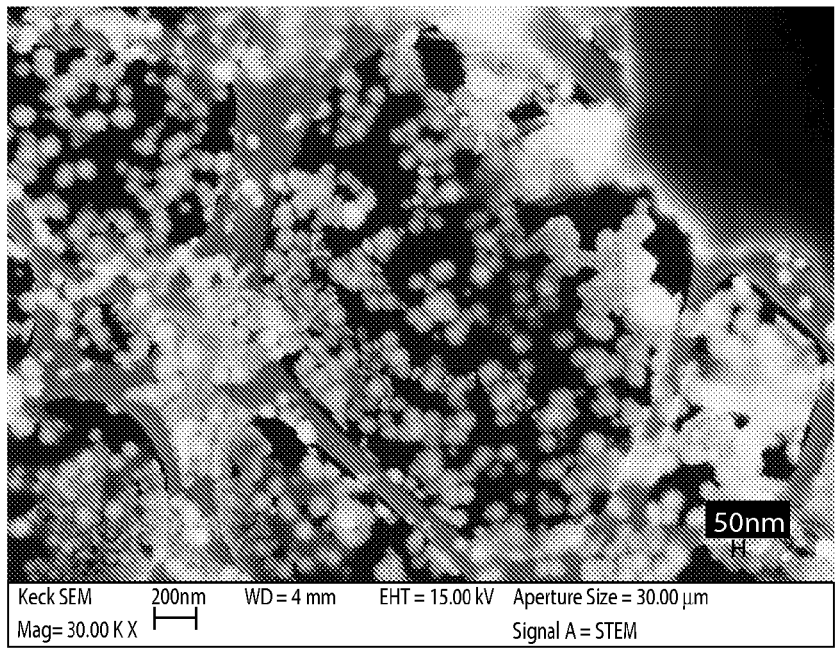
FIGS. 6A-B are copies of SEM images of the carbon-coated $Li_4Ti_5O_{12}$ nanoparticle composition described in Example 5.
Figure 6B:
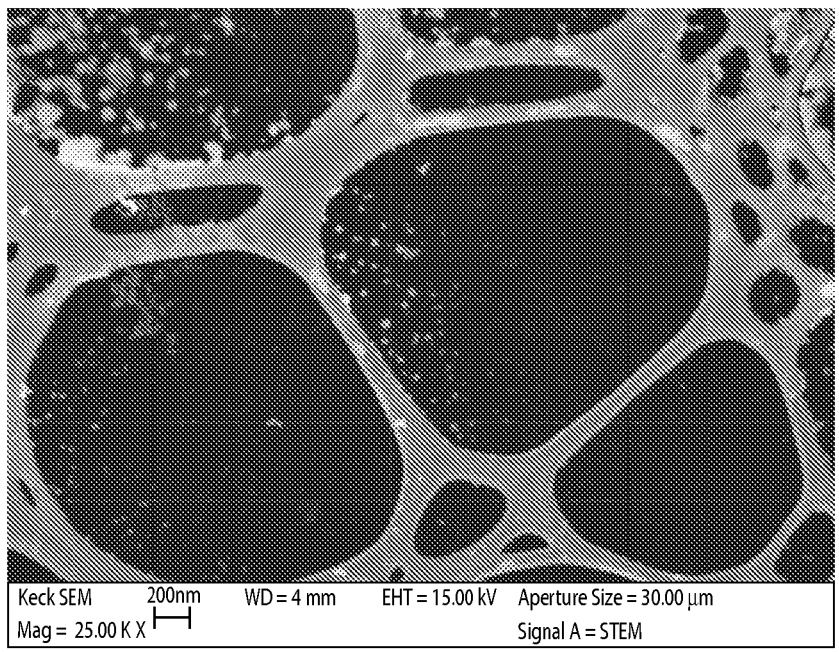
Figure 6C:
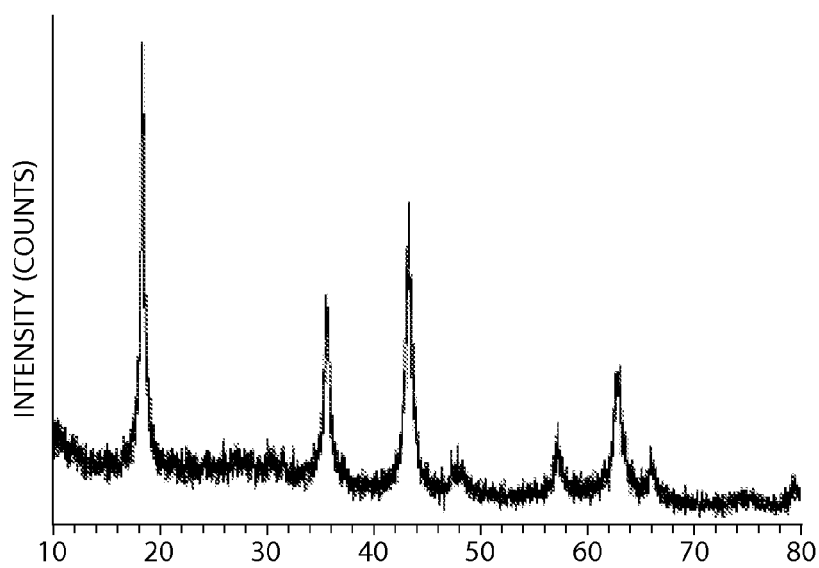
FIG. 6C is a plot of the XRD data obtained from the carbon-coated $Li_4Ti_5O_{12}$ nanoparticle composition described in Example 5.

The milled particles were characterized using several techniques. The BET surface area was measured to be about 115 m$^2$/g using a multi-point BET measurement instrument. Particle size analysis was conducted using an SEM. The average particle size was determined to be between about 30 and 50 nm, with the particles having a substantially spherical morphology. FIGS. 6A-B are copies of SEM images showing a representative portion of the milled nanoparticle composition. XRD analysis indicated that the carbon-coated Li$_4$Ti$_5$O$_{12}$ nanoparticle composition had a crystal structure which is identical to the crystal structure of the feed particles (prior to milling). FIG. 6C is a plot of the XRD data.

EXAMPLE 6

This example illustrates production of a lithium-based compound coated particle composition in accordance with an embodiment of the present invention.

Carbon-coated Li$_4$Ti$_5$O$_{12}$ nanoparticle compositions were produced in a milling process. The milling process used a mill and multi-carbide material grinding media grinding media. About 30 g Li$_4$Ti$_5$O$_{12}$ was mixed with 200 g of isopropyl alcohol (IPA) and 0.2% 3,6,9-trioxadecanoic acid within the mill to form a slurry. The slurry was processed at a specific energy of 50,000 kJ/kg. A peristaltic pump was used with an agitator speed of 1212 rpm. Carbon-coated Li$_4$Ti$_5$O$_{12}$ nanoparticle compositions were obtained.

Figure 7A:
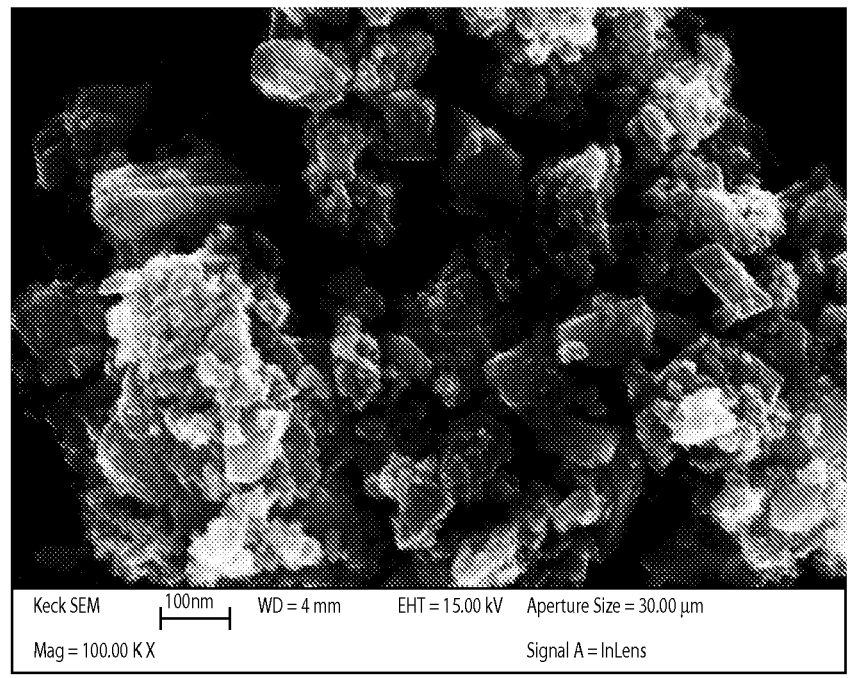
FIGS. 7A-B are copies of SEM images of the carbon-coated $Li_4Ti_5O_{12}$ described in Example 6.
Figure 7B:
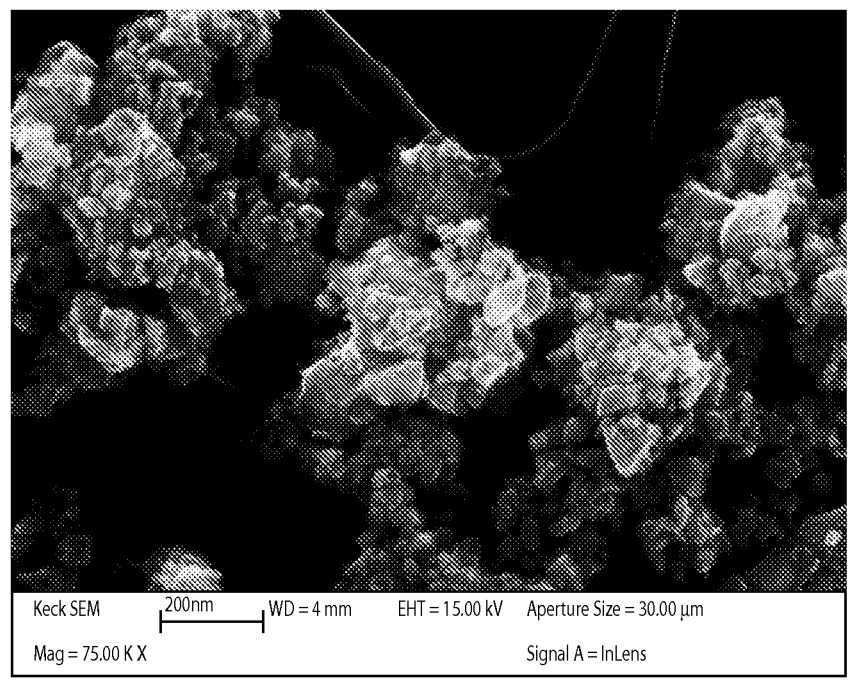
Figure 7C:
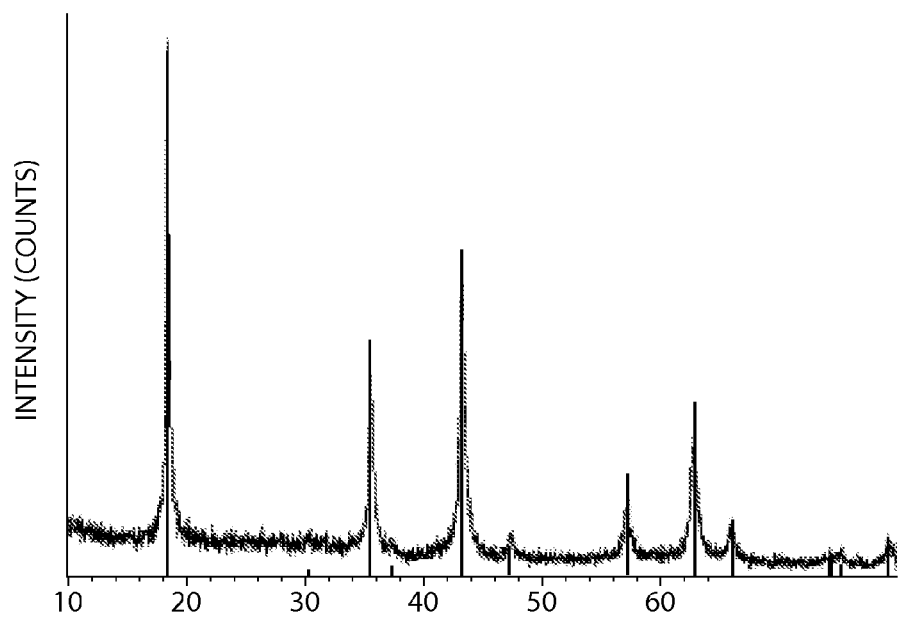
FIG. 7C is a plot of the XRD data obtained from the carbon-coated $Li_4Ti_5O_{12}$ nanoparticle composition described in Example 6.

The milled particles were characterized using several techniques. Particle size analysis was conducted using an SEM. The average particle size was determined to be between about 30 and 50 nm, with the particles having a platelet morphology. FIGS. 7A-B are copies of SEM images showing a representative portion of the milled nanoparticle composition. XRD analysis indicated that the carbon-coated Li$_4$Ti$_5$O$_{12}$ nanoparticle composition had crystal structure which is identical to the crystal structure of the feed particles (prior to milling). FIG. 7C is a plot of the XRD data.

EXAMPLE 7

This examples illustrates production of a lithium-based compound coated particle composition in accordance with an embodiment of the present invention.

Carbon-coated LiFePO$_4$ nanoparticle compositions were produced in a milling process. The milling process used a mill and multi-carbide material grinding media grinding media. About 30 g LiFePO$_4$ was mixed with 300 g of anhydrous isopropyl alcohol (IPA) and 0.2% 3,6,9-trioxadecanoic acid within the mill to form a slurry. The slurry was processed at a specific energy of 45,000 kJ/kg. A peristaltic pump was used with an agitator speed of 1320 rpm. Carbon-coated LiFePO$_4$ nanoparticle compositions were obtained.

Figure 8:
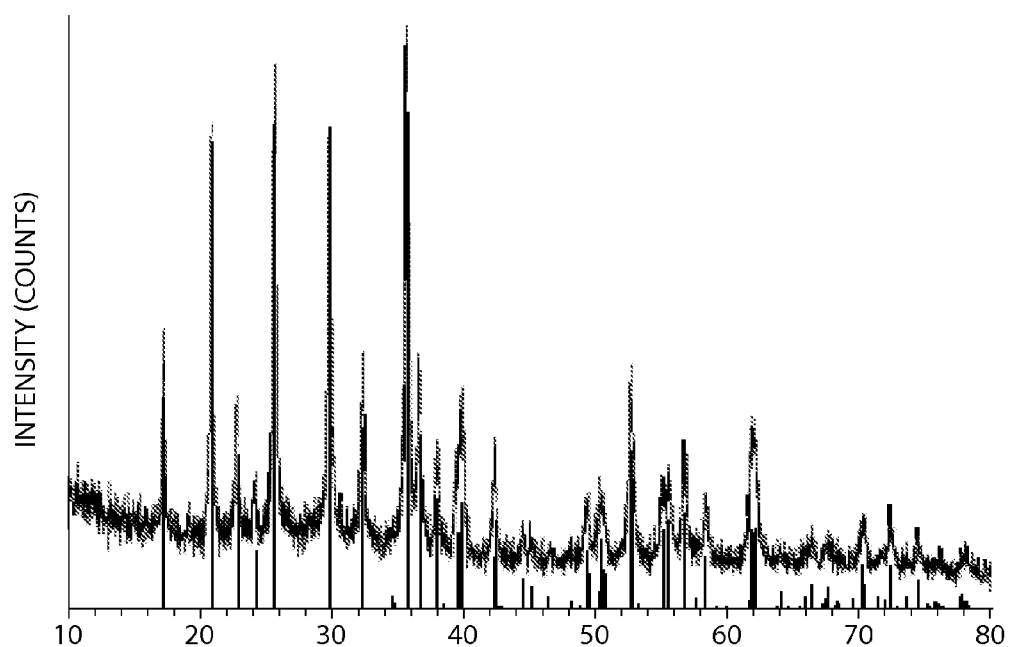
FIGS. 8-8A are copies of SEM images of carbon-coated $LiFePO_4$ nanoparticle composition described in Example 7.
Figure 8A:
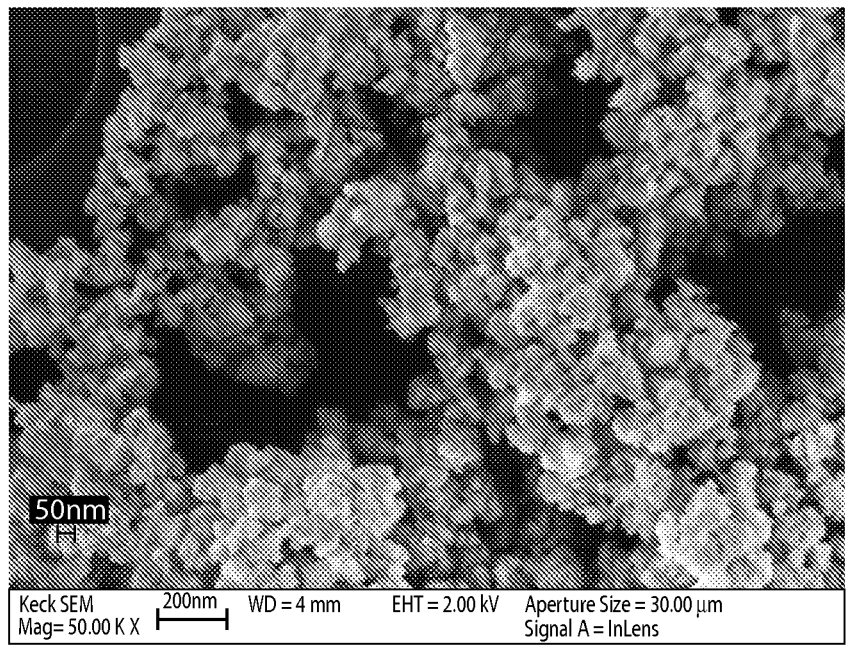
Figure 8B:
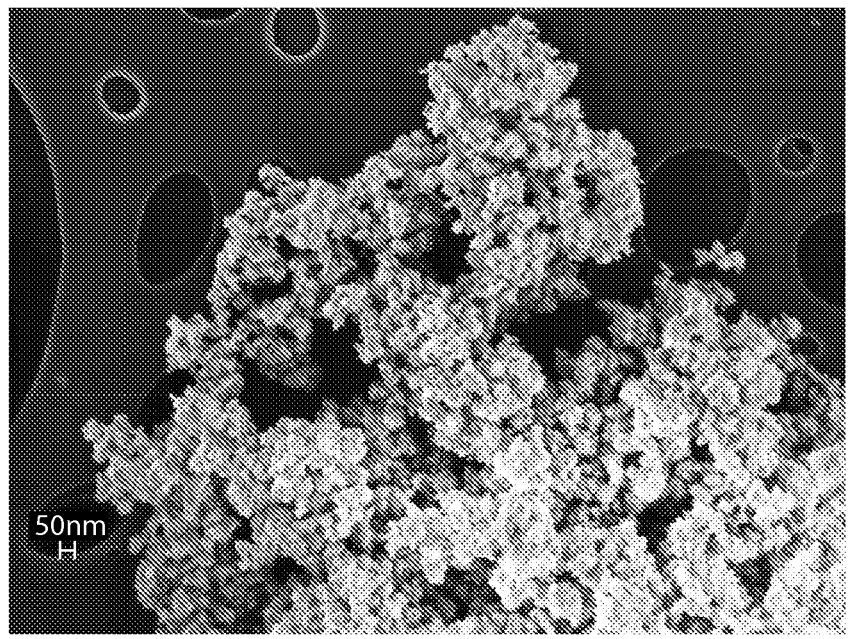
FIG. 8B is a plot of the XRD data obtained from the carbon-coated $LiFePO_4$ nanoparticle composition described in Example 7.

The milled particles were characterized using several techniques. The BET surface area was measured to be about 40 m$^2$/g using a multi-point BET measurement instrument. Particle size analysis was conducted using an SEM. The average particle size was determined to be between about 30-50 nm, with the particles having a platelet morphology. FIGS. 8A-B are copies of SEM images showing a representative portion of the milled nanoparticle composition. XRD analysis indicated that the carbon-coated LiFePO$_4$ nanoparticle composition had a crystal structure which is identical to the crystal structure of the feed particles (prior to milling). FIG. 8C is a plot of the XRD data.

What is claimed:

1. A method for producing coated particle compositions, comprising:
   providing a feed material comprising negatively charged lithium-based compound feed particles and a positively charged coating material precursor, and a fluid carrier; and
   milling the feed material with the fluid carrier to reduce the feed particle size and to coat the feed particles with the coating material to form a composition including coated lithium-based compound milled particles having an average particle size of less than 250 nm.

2. A method as in claim 1, further comprising milling the feed particles and the coating material precursor, prior to milling the feed material.

3. A method as in claim 1, wherein the coated lithium-based compound milled particles have an average particle size is less than 100 nm.

4. A method as in claim 1, wherein coating material precursor comprises particles.

5. A method as in claim 1, wherein the milled particles comprise a lithium phosphate-based compound.

6. A method as in claim 1, wherein the milled particles comprise a lithium oxide-based compound.

7. A method as in claim 1, wherein the milled particles comprise a lithium titanate-based compound.

8. A method as in claim 1, wherein the coating comprises carbon.

9. A method as in claim 1, wherein the fluid carrier comprises water or N-methyl pyrrolidinone.

10. A method as in claim 1, wherein the feed material further comprises an acid.

11. A method as in claim 1, wherein the feed material further comprises a surfactant.

12. A method as in claim 1, further comprising milling the feed material in a media mill using grinding media.

13. A method as in claim 12, wherein the grinding media have a density of greater than 8 gm/cc.

14. A method as in claim 12, wherein the grinding media have a size between about 75 microns and 150 microns.

15. A method as in claim 1, wherein the feed particles and the coating material precursor interact via an electrostatic interaction.

* * * * *